INVENTOR
MICHAEL WILLIAMS
BY Kurchitum, Kurch, E.. & Hayu
ATTORNEYS 3,423,707
ARRANGEMENTS FOR PRODUCING MAGNETIC FIELDS USING SUPERCONDUCTING MAGNETS
Michael Williams, Watford, England, assignor to The General Electric Company Limited, London, England, a British company
Filed June 21, 1966, Ser. No. 559,314
Claims priority, application Great Britain, June 23, 1965, 26,584/65
U.S. Cl. 335—216     3 Claims
Int. Cl. H01b 7/22, 1/00

ABSTRACT OF THE DISCLOSURE

For producing a region of magnetic field of high intensity there are arranged within a large diameter magnetized tube of hard superconducting material a number of smaller diameter oppositely magnetized superconducting tubes, the smaller tubes being arranged in a ring round the inner wall of the large tube with all the tube axes parallel to one another, the assembly being maintained below the critical temperature in a cryostat so that the magnetic fields of the solenoids formed by the tubes are additive along a working space within the large diameter tube.

Figure 1:
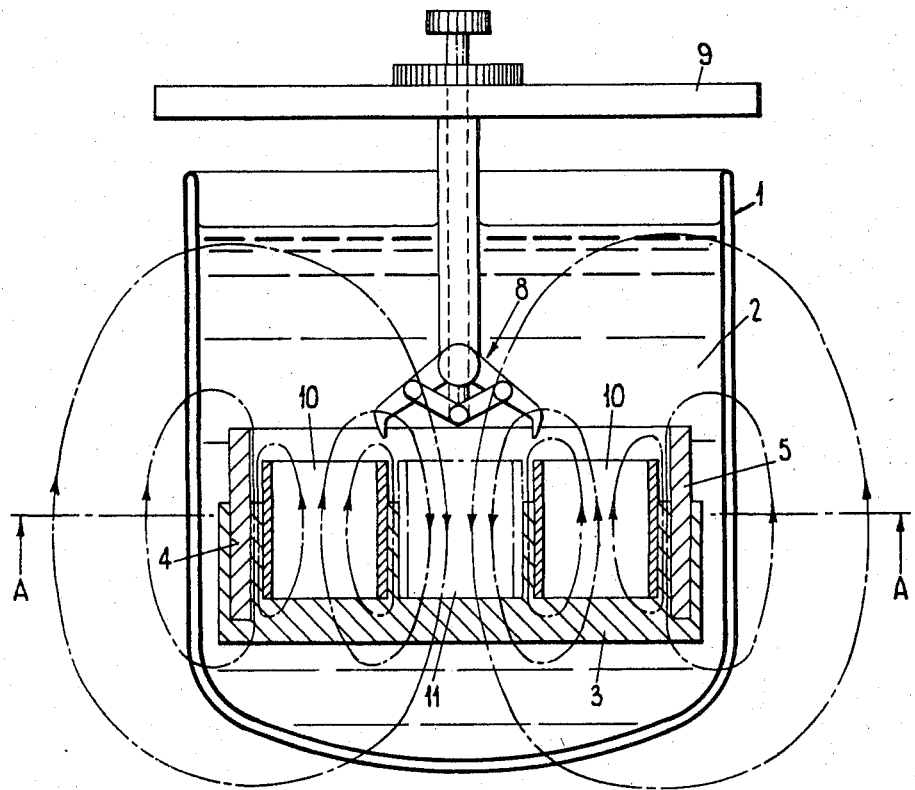

For building up the magnetic field of high intensity a method of progressively increasing the magnetization of each of the smaller tubes in turn is proposed in which a further small tube of hard superconducting material is magnetized to a high intensity by insertion in the said working space and is then substituted for one of the ring of small tubes which in turn has its magnetization increased by insertion into the working space and is then used to replace a further small tube, and so on.

---

This invention relates to arrangements for producing magnetic fields using superconducting magnets, that is to say magnets formed of superconducting material maintained below the critical temperature whilst carrying circulating electric currents which set up a magnetic field constituting the field of the magnet.

Such magnets have hitherto usually consisted of coils of wire formed from superconducting material, such as niobium/tin intermetallic compound, for example as solenoids or Helmholtz pairs, but with them it has not been economically possible to obtain magnetic fields of very high intensity and/or extending over an appreciable volume of space.

The object of this invention is to provide novel arrangements with which such results can be achieved more cheaply.

According to one aspect of the invention, an arrangement for producing a magnetic field comprises a plurality of superconducting solenoids each in the form of a tube of hard superconducting material maintained below the critical temperature whilst carrying electric currents circulating round the tube axis, said tubes being grouped together so that their magnetic fields are additive over an appreciable volume of space.

It will be understood that the term "hard" superconducting material means hard in the magnetic sense as now used for superconductors, i.e., exhibiting hysteresis and capable of carrying higher current densities at higher applied magnetic fields than the so-called soft superconductors, which are in general elemental materials. Also the term tube includes helices with closely spaced turns and joined ends as well as solid walled tubes.

Preferably, however, the solenoid tubes are solid walled tubes of sintered hard superconducting material, since such tubes are relatively cheap to manufacture, and can be magnetized to high intensity in the superconducting state.

The tubes may, for example, be arranged end to end to form a long solenoid, or side by side, with their axes parallel and with similar field polarity, to form the equivalent of a thick sheet magnet.

However, according to a further aspect of the invention, a very high intensity magnetic field is produced within the interior of a relatively large tube of superconducting material maintained below the critical temperature by arranging around the inner wall of the tube a plurality of superconducting magnets each in the form of a tube of relatively small diameter, with the axes of the large and small tubes all parallel to each other, and with the small tubes of similar polarity to each other and such that their magnetic fields are additive in an empty space of appreciable cross-sectional area along the centre of the relatively large tube.

The small tubes should have cross-sections adding up in area to more than the cross-sectional area of the spaces between the tubes through which the magnetic flux threading the tubes returns, so as to produce increased magnetic intensity by flux compression.

For obtaining still higher magnetic field intensities along the centre of the relatively large tube, the latter may itself be in the form of a superconducting magnet previously magnetized in the opposite sense to that of the small tubes so that its interior magnetic flux is not only additive to the exterior fluxes of the small tubes but is compressed by the presence of the latter tubes so as further to intensify the field along said central space.

This central space provides a working space, which can be of appreciable volume, permeated by a magnetic field of very high intensity, and which can be used for experimental or other purposes.

As one particular use it can be arranged that the working space is sufficiently large to accommodate a work tube of superconducting material of the same size as the field intensifying tubes within the larger tube. For example, the large tube may contain six smaller tubes, of external diameter somewhat less than one third the internal diameter of the larger tube, arranged round its inner wall.

By allowing the work tube to cool down slowly from the normal state to the superconducting state whilst situated in the working space, it will become magnetized to an intensity gerater than that of individual tubes and with opposite polarity.

The work tube can then be removed, reversed and used to replace one of the field intensifying tubes, so that by successive application of this procedure all the field intensifying tubes can be repeatedly replaced by tubes of higher magnetization until the system has been built up to produce the maximum field attainable in practice in the working space.

The superconducting magnets must, of course, be moved into and out of the magnetic fields very slowly to avoid the material turning normal, and the apparatus must be constructed to withstand and deploy the large forces involved. For this reason the forces can if desired be arranged to balance out as far as possible; for example, when forcing magnetized solenoids into a flux-compressing magnetized tube, they may be arranged in pairs and introduced from opposite ends of the tube.

Tubes of hard superconducting material suitable for use in accordance with the invention can be formed from 200 mesh niobium and tin powders mixed to give the composition $Nb_3Sn$, compacted into the required tubular form at 10 tons/in.$^2$ pressure, and sintered at 925° C. for two hours in an argon atmosphere to form the tubes. Any other suitable method of forming superconducting tubes can, however, be used.

Figure 2:
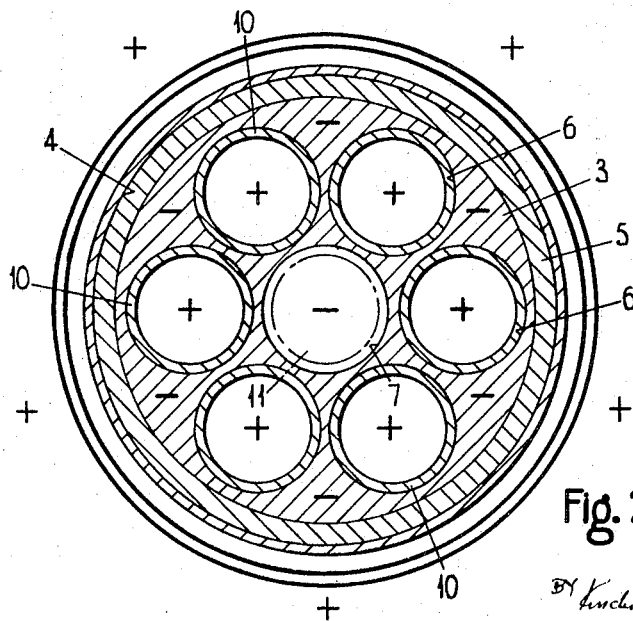
Figure 3:
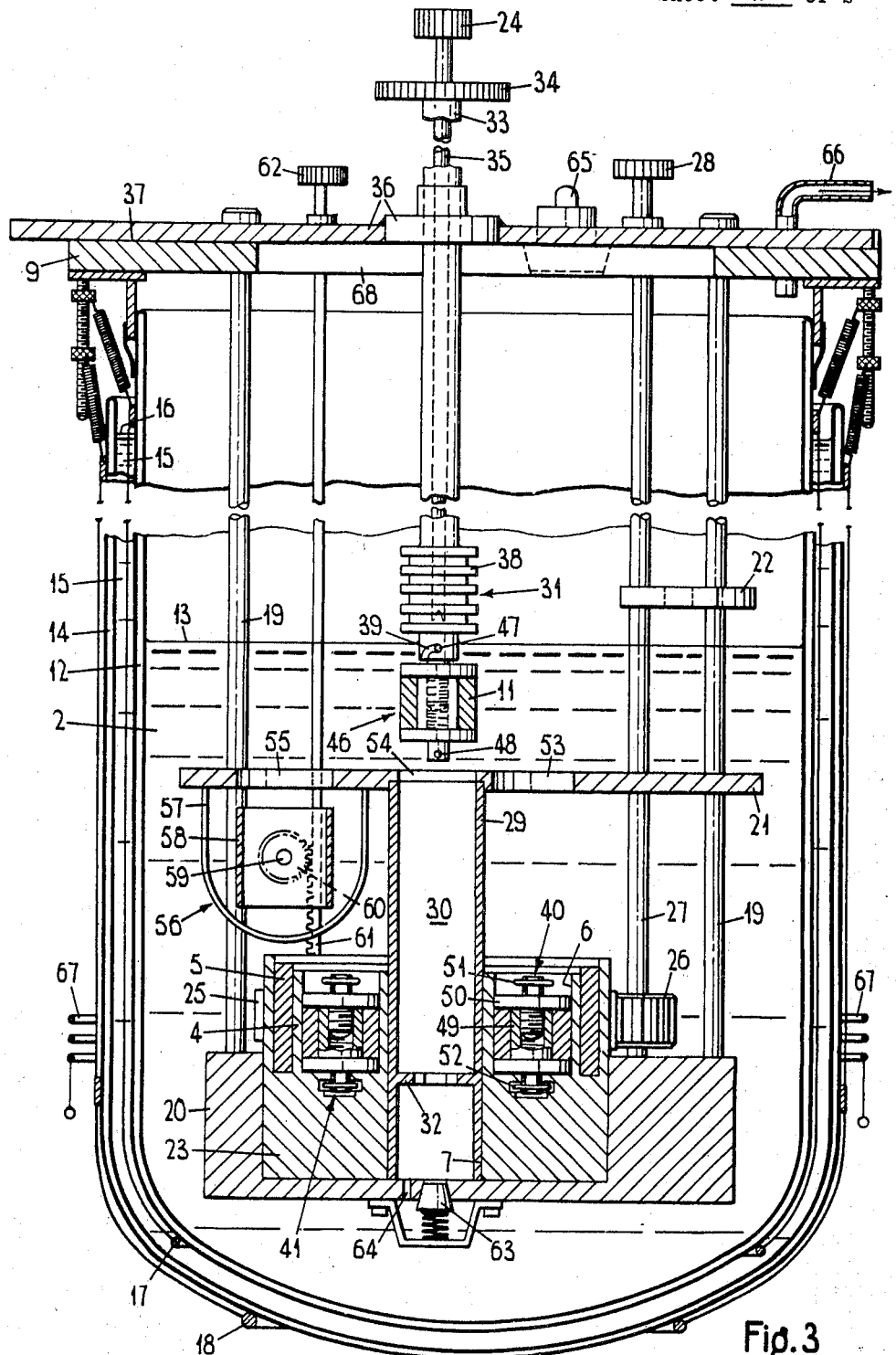

The invention will be further descirbed with reference to the accompanying drawings in which:

FIGURE 1 shows a schematic sectional view of a cryostat containing within an outer superconducting tube a ring of flux-compressing magnetized solenoid tubes surrounding a central working space, FIGURE 2 shows a schematic section in the plane A—A in FIGURE 1, and FIGURE 3 illustrates in diagrammatic part-sectional elevation (partly broken away for reducing the drawing length) a form of apparatus for building an assembly of magnetized superconducting tubes of the kind indicated schematically in FIGURE 1.

Referring first to FIGURES 1 and 2, there is shown a cryostat vessel 1 partly filled with liquid helium 2 within which is immersed a circular brass holder 3 for the superconducting tubes.

The holder 3 carries on its upper surface an outer slot 4 in which is seated an outer tube 5 of hard superconducting material magnetized to form a solenoid with upper south pole and lower north pole as indicated by the chain-dotted arrowed flux lines. The holder 3 also carries on its upper surface six holes 6 arranged in a ring around the inner wall of the tube 5 and about a central hole 7 which provides a working space into which articles can be inserted by means of a grab 8 working through the outer cover 9 of the cryostat.

In each of the holes 6 is seated a solenoid tube 10 of hard superconducting material magnetized with upper north pole and lower south pole as represented by the full arrowed flux lines so that all the fluxes are additive in the working space 7, which is illustrated as containing a specimen tube 11 of superconducting material, represented in dotted outline.

The tubes 10 should be grouped as closely as possible to each other and the working space 7, and surrounded as closely as possible by the outer tube 5, so as to secure the maximum flux compression within the outer tube and the maximum intensity of magnetic flux permeating the working space.

Referring now to FIGURE 3, there is shown a double-walled cryostat consisting of an internal evacuated hollow-wall vessel 12, filled with liquid helium 2 to the depth indicated by the line 13, contained within an outer evacuated hollow-wall vessel 14 filled with liquid nitrogen 15 to the depth indicated by the line 16. The two vessels are suspended from an upper lid and support metal cover 9 by means of wire basket and spring support means 17 and 18.

Suspended within the inner vessel 12 from the cover 9 is a framework consisting of vertical stainless steel tubes 19 which carry a fixed lower horizontal outer brass holder 20 and an upper horizontal brass partition 21. To one of these tubes 19 there is also attached at an even higher point above the helium level 13 and to one side a small horizontal platform 22.

The fixed lower horizontal outer brass holder 20 is recessed circularly as shown, and carries a thick annular inner movable horizontal brass holder 23 protruding in part above the level of the fixed outer holder 20 and being provided around its outer protruding circular surface with the vertical teeth such for example as 25 of a crown gear which may intermesh with the vertical teeth of an interlocking drive cog 26 centered on a vertical steel control rod 27 which may be readily rotated horizontally from outside the cryostat arrangement by turning the knob 28 at the top and may so cause the circular inner brass holder 23 to rotate any given desired amount about its central vertical axis.

The rotatable holder 23 carries on its upper surface an annular outer slot 4 in which is seated an outer tube 5 of hard superconducting material which can be magnetized to form a solenoid by inducing electric currents to circulate thereround. The rotatable holder 23 also carries on its upper surface six identical holes 6, such as the two appearing in the figure, these holes being arranged in a ring around the inner wall of the tube 5 and about a central hole 7 extending right through 23 within which there is held in place a vertical length of nonmagnetic steel or brass tube 29 extending just up to the level of the upper horizontal partition 21 but well beneath the helium level 13. The inside of this tube 29 provides a working space 30 into which articles can be inserted by means of a transferring arrangement 31 working through the outer cover 9 of the cryostat. Within this tube 29 and at the level of the base of the holes 6 there is provided a support ring 32 upon which such inserted articles take up their rest position.

The transferring arrangement 31 comprises a vertical outer steel tube 33, rotatable and capable of being raised or lowered from outside the cryostat by the knob 34, and an inner thin steel tube 35 likewise rotatable and capable of being raised or lowered from outside the cryostat and being operated by the knob 24. These tubes 33 and 35 are carried by a slide 36 which is supported by the upper lid cover 9, the slide 36 running in a groove 37 with tube slot 68 in the lid 9 and enabling the transferring arrangement to be moved horizontally at will as well as vertically. The outer tube 33 has fitted round it near its lower end a plunger 38 of such diameter as to form a good fit with the inner walls of the nonmagnetic steel tube 29 when inserted into this tube 29. At the very end of the outer tube 33 there are two diametrically opposite spiralled slot inlets such as 39. The inner tube 35 is forked into a prong at its lower end.

The articles to be transferred, such as the capsules 40, 41, etc., filling the six holes 6, the capsule 46 shown suspended from the transferring arrangement 31 in the figure, or specimens to be inserted within the tube 29 in use of the arrangement, are provided with horizontal pins (such as 47 and 48) at top and bottom so that for example to be picked up the forked end of tube 35 can be lowered onto the centre of the upper pin 47 to prevent it from rotating whilst slots 39 in the outer tube 33 are screwed onto the outer ends of the pin. Similarly to effect disengagement, gripping with the tube 35 and screwing in the opposite sense with the tube 33 is employed.

Each of the capsules 40, 41, 42, 43, 44 and 45 carried in the holes 6 (not all shown in the figure) and the capsule 46 shown held by the transferring arrangement 31 are identical and are therefore interchangeable. Each comprises a lower hollow brass portion such as 49 of capsule 40 provided with an internal thread and a flanged base, an upper brass portion 50 flanged at the top and screwed into the lower portion so as to firmly hold a short cylinder 10 of hard superconducting material therebetween. Short bayonet pins 51 and 52 protrude horizontally from the upper and lower flanges respectively to enable the whole capsule to be picked up and moved by the transferring arrangement 31 when desired as described and to twist into slots at the bases of the holes 6 and under the support ring 32 when in the central position 30 to secure firmly and prevent from being forced out by magnetic forces of interaction.

The partition 21 has three circular apertures 53, 54 and 55 cut in it of sufficient diameter to allow any of the capsules to be carried therethrough by the transferring arrangement. The aperture 53 enables capsules to be placed in or removed from any one of the holes 6, which holes are arranged to be brought in turn directly underneath the aperture by rotation of the rotatable brass holder 23 through actuation of the cog drive 26 using the knob 28.

The aperture 54 enables a capsule to be let down into or removed from the working space 30 within the nonmagnetic tube 29.

The aperture 55 permits a capsule to be let down into or removed from a device 56 adapted for turning a capsule upside down. This device 56 comprises a flexible steel constraining band 57 which prevents a capsule from falling out whilst being turned over, a short holder cylinder 58 pivoted at its sides and capable of being rotated about a horizontal shaft 59 on which is also carried a cog wheel 60 in intermeshing engagement with a ratchet rod 61 which extends upwards to outside the cryostat. By merely raising or lowering the external handle 62 of the ratchet rod 61 the cog wheel 60, shaft 59, holder cylinder 58 and any capsule previously placed in the holder cylinder 58 may be caused to rotate and to an extent such that holder cylinder 58 and any capsule contained may be inverted as compared with their initial positions. The inverted capsule may then be readily removed by lowering the transferring arrangement 31 upon it attaching itself as previously described (but this time to the bayonet pin at the opposite end of the capsule) and removed as required.

There is provided centrally at the bottom of the fixed lower brass holder 20 a sprung one way valve 63 and an orifice 64. This arrangement is such that when a relatively warm capsule such as 46 is swiftly lowered from above the helium level 13 and into the tube 29 and the plunger 38 takes up a good fit with the inner walls of the tube 29, the excess pressure caused in the space 30 by the boiling of the liquid helium around the warm capsule causes all the liquid helium and any excess helium gas to be quickly blown out through the valve 63 so that the capsule 46 reaches its desired rest position on the support ring 32, to which it may be secured by twisting, and then proceeds to cool below the critical temperature of the hard superconducting material employed and become superconducting without actually doing so before reaching this position, which would be undesirable. The orifice 64 is an aid to the cooling in the desired position as it permits liquid helium to flow slowly back in and accelerate the cooling when the capsule has in fact reached the desired position.

A helium-tight plug seal 65 shown in the metal cover 9 of the cryostat may be removed for example to provide entry for specimens for use in high magnetic field experiments. A pipe 66 to carry off the boiled off helium is shown. An electromagnet 67 for providing the initial magnetizing flux required for the magnetization procedure now to be described is provided at the base and just outside the double-walled cryostat.

One method of magnetization procedure for producing a region of very high magnetic field within the working space inside the tube 29 will now be described. With the inner cryostat 12 empty of helium and with capsules secured in each of the six holes 6 but with the central space 30 empty and the seventh capsule parked upon the platform 22, the electromagnet 67 is switched on to provide a downward magnetizing flux of strength for example 300 gauss throughout the whole volume of inner brass holder 23 and in particular through the six capsules in the holes 6 and throughout the space contained within the outer tube 5. Liquid helium is then let into the inner cryostat 12 to the level 13 shown and sufficient time is allowed to elapse for the outer tube 5 and each of the six tubes 10 of hard superconductive material to cool to the superconducting state. The current through the electromagnet 67 is then slowly and smoothly reduced to zero thus causing circulating electric currents to be set up and maintained in the outer superconducting tube 5 and each of the six superconducting tubes 10. These currents are of such values as to maintain the magnetic fluxes through the said tubes at their former values prior to the reduction of the current through the electromagnet. The transferring arrangement 31 is then slid along the groove 37 until directly over the aperture 53 in the plate 21. The knob 28 is turned so turning the cog 26 and thereby the inner brass holder 23 until a magnetized capsule, say 40, is brought directly beneath the aperture 53. The inner thin steel tube 35 with the forked end is then lowered onto the magnetized capsule 40 to grip its upper bayonet pin by means of the forked end and is thereby held steady whilst the outer tube 33 is lowered and twisted clockwise onto the bayonet pin. The magnetized capsule is then twisted slightly to disengage the lower bayonet pin 52 from the holder 23 and is then withdrawn upwards through the aperture 53 by raising the knob 34. Whilst maintaining the magnetized capsule 40 all the while beneath the liquid helium level 13, the transferring arrangement is slid along the groove 37 until directly over the inverter device 56. The knobs 34 and 36 are then depressed forcing the magnetized capsule 40 downwards through the aperture 55 until central within the holder tube 58. The bayonet pin 51 is then gripped with the forked end of the tube 35 and tube 33 is then given an anticlockwise twist to disengage from the capsule. Tubes 33 and 35 are then removed upwards. The ratchet 61 is then raised by the knob 62 so as to turn the cog wheel 60 and cause the tube 58 and the magnetized capsule 40 contained within to turn through 180°.

The transferring arrangement 31 is then lowered again through the aperture 55, engaged with the bayonet pin 52 and the magnetized capsule 40 is removed, all the while beneath the helium level, replaced and secured in the hole 6 previously vacated by it but now of course with its direction of magnetization reversed with respect to the outer magnetized tube 5. This procedure of reversal described is then performed for each of the other five capsules in the holder 23. This results in an increase in the flux density in the space 30 where the magnetic fluxes of the outer tube 5 and the capsules reinforce one another.

The transferring arrangement 31 is then used to pick up the capsule 46 in the normal state from the parking platform 22 above the liquid helium level and in the relatively warm helium gas, to bring this capsule 46 centrally above the tube 29 whilst still above the liquid helium level 13 and then to plunge this capsule 46 down into the central space 30 as swiftly as possible, the plunger 38 acting with the steel tube 29 and the valve 63 as previously described to blow out the liquid helium from the space 30 and to enable the capsule 46 to take up and become secured in this position 30 whilst its tube 11 is still in the normal state. Cooling then occurs as the liquid helium seeps back through the orifice 64 and when the temperature of the tube 11 becomes sufficiently below Tc, the critical temperature of the hard superconductive material of which it is composed, the tube 11 changes to the superconducting state and the flux lines within the bore of this tube 11 become trapped or "frozen in." Moreover, more flux lines will be frozen in to this tube 11 of the capsule 46 in the central space 30 than the number of flux lines maintained by the self-magnetization of each of the six peripheral capsules.

The capsule 46 is then raised (circulating electric currents thereby being set up in its tube 11 so as to maintain the flux within its bore) and placed in the inverter 56, where it is inverted. One of the peripheral capsules is then raised right out of the liquid helium, thereby turning normal, and is placed on the parking platform 22. The capsule 46, inverted as described, is then transferred, all the while beneath the liquid helium level 13, into the vacant hole and secured by twisting. Since this latter capsule is more strongly magnetized than the previous capsule in that place, the flux density in the central space 30 will be greater than before. The capsule from the parking space is therefor transferred from the parking space and let down into the space 30 to have this greater flux frozen within it and after inversion used to replace one of the other five capsules, the process being continued to produce a progressive increase in the flux in the working space 30.

I claim:
1. An arrangement for producing a region of magnetic field of high intensity comprising a cryostat, a first magnetized tube of hard superconducting material and a plu- rality of magnetized superconducting solenoids each in the form of a smaller diameter tube of hard superconducting material, in which the first said tube and said solenoids are enclosed within said cryostat and maintained below the critical temperature, said solenoids being arranged with their axes parallel to one another and to the first said tube in a ring within and round the inner wall of the first said tube and being magnetized in the same direction of magnetic polarity with respect to one another but in the opposite direction with respect to that of the first said tube, the spacing of said solenoids in the arrangement being such that a working space is provided along the interior of the first said tube wherein a magnetic field of high intensity is produced.

2. A method of producing a region of magnetic field of high intensity wherein there is formed an arrangement comprising a plurality of magnetized superconducting solenoid tubes of hard superconducting material, a larger diameter tube of hard superconducting material and a cryostat, the solenoid tubes being disposed in a ring within and round the inner wall of the larger tube with their axes aligned parallel to one another and to the axis of the larger tube so as to leave a working space extending along the interior of said larger tube and within the ring, and the whole of which tubes are enclosed within the cryostat so that the tubes are maintained below the critical temperature, and wherein an auxiliary solenoid tube is magnetized by induction to a higher intensity than any of the tubes in the ring by insertion into said working space, cooling to below the critical temperature, and removal while maintained in the superconducting state, one of the ring of solenoid tubes is removed and allowed to revert to the normal state, the auxiliary tube is then inverted to reverse its direction of magnetic polarization and substituted for the removed tube in the ring, and the removed tube is thereafter used as the auxiliary solenoid tube in repetition of the process with removal of a different tube from the ring, the cycle of operations being repeated a number of times with removal in turn of all the tubes in the ring so as to progressively build up a magnetic field of high intensity in the said working space.

3. A method of producing a region of magnetic field of high intensity wherein there is formed an arrangement comprising a plurality of solenoid tubes of hard superconducting material arranged with their axes parallel to one another and in a ring within and around the inner wall of a larger diameter tube of hard superconducting material whose axis is parallel to the solenoid tube axis and so as to leave a working space extending along the interior of the said larger diameter tube and within the ring, the arrangement of tubes is cooled in a cryostat below the critical temperature of the material of the tubes while they are subjected to an externally applied magnetic field axial to the tubes which field is then removed to effect magnetization of the superconducting tubes, each of the interior ring of solenoid tubes is then inverted to reverse its direction of magnetic polarization, an auxiliary solenoid tube is magnetized by induction to a higher intensity than that of any of the tubes in the ring by insertion into said working space, cooling to below the critical temperature and removal from the working space while maintained in the superconducting state, one of the ring of solenoid tubes is removed and allowed to revert to the normal state, the auxiliary tube is inverted to reverse its direction of magnetic polarization and substituted for the removed tube in the ring, and the removed tube is thereafter used as the auxiliary solenoid tube in repetition of the process with removal of a different tube from the ring, the cycle of operations being repeated a number of times with removal in turn of all the tubes in the ring so as to progressively build up a high intensity of magnetic flux in the working space.

References Cited

UNITED STATES PATENTS 3,233,155    2/1966    Atherton _____ 335—216

GEORGE HARRIS, *Primary Examiner.*

U.S. Cl. X.R.

335—284